Dec. 30, 1930. G. A. KLIMEK 1,786,433
POWER TRANSMITTER
Filed March 3, 1927 4 Sheets-Sheet 1

Dec. 30, 1930. G. A. KLIMEK 1,786,433
POWER TRANSMITTER
Filed March 3, 1927 4 Sheets-Sheet 3

Inventor
Gustav A. Klimek
By his Attorney

Dec. 30, 1930.    G. A. KLIMEK    1,786,433
POWER TRANSMITTER
Filed March 3, 1927    4 Sheets-Sheet 4

Patented Dec. 30, 1930

1,786,433

UNITED STATES PATENT OFFICE

GUSTAV A. KLIMEK, OF EAST RUTHERFORD, NEW JERSEY, ASSIGNOR TO TURBINE PATENTS CORPORATION, OF NEW YORK, N. Y., A CORPORATION OF DELAWARE

POWER TRANSMITTER

Application filed March 3, 1927. Serial No. 172,285.

This invention relates to hydraulic power transmitting means of the fluid clutch type in which the parts are so combined and connected with other elements of the mechanism as to give efficient power transmission, and at the same time the desired cushioning or shock absorbing action.

Although my invention in its preferred form is particularly adapted for use in a motor vehicle for transmitting power from the engine to the main propeller shaft it is also applicable in various other forms of apparatus, engines, and power plants for the transmission of power from a driving to a driven shaft, and particularly where either shaft is liable to be subjected to sudden speed variations.

It is well recognized that by transmitting power through a hydraulic power transmitter or fluid clutch of the kind in which kinetic energy is transmitted to the turbine rotor from a centrifugal impeller, smoother operation is secured, wear is reduced, and that there results increase in the life of both engine and running gear, because the shocks and irregularities of operation of each are cushioned and absorbed so that they are not transmitted from one to the other.

It has been proposed to use a hydraulic power transmitter in connection with a positive clutch and with these elements either in parallel or in series. The parallel arrangement is satisfactory for starting, but the fluid clutch ceases to function when the mechanical clutch is engaged and, furthermore, the fluid clutch must permit such slippage that the engine can idle without turning the driven shaft. The series arrangement necessitates making the fluid clutch of such size and capacity that it effectively transmits the maximum loads at the maximum speeds and still operates satisfactorily with light loads and low speeds, which involves difficulties not easy to overcome. The use of a differential gear with the hydraulic and mechanical clutches involves considerable expense for the gears, their bearing, etc.

In my improved constructions I provide a fluid clutch in which the actuating liquid is in continuous circulation and provide a shiftable member whereby the liquid is ineffective to drive the driven part of the clutch when said part is in one position. The clutch is constructed in such a manner that the driving connection between the driving and driven member may be effected gradually thus eliminating the grabbing effect which results from the use of a mechanical clutch due to faulty operation by the operator. For this reason the starting and acceleration of a car may be made smooth and uniform. Furthermore, since the operating liquid is in continuous circulation the amount of liquid admitted to the turbine rotor of the fluid clutch may be varied and consequently the power for acceleration and hill climbing may be varied as required. When the driving and driven shafts have been connected by the clutch, the clutch becomes a resilient coupling between the engine and the driven mechanism and acts to absorb and neutralize shocks caused as by missing of explosions in the engine, road shock and torsional vibration of crank shaft. The construction of the power transmitter may be such that the energized liquid from the centrifugal impeller may pass directly to the turbine rotor or may be by-passed freely and without obstruction from the outlet of the centrifugal pump to the inlet thereof. The inlets and outlets of the passages in the turbine rotor may be closed during the by-passing of the energized fluid.

As another important feature the centrifugal pump and turbine are so designed that the energized fluid from the pump is supplied substantially radially inwardly from the pump to the turbine rotor thus substantially eliminating pressure in a direction to separate the impeller and rotor. This feature is of especial value when the vanes of the turbine rotor are shiftable axially of the clutch into and out of the path of the energized fluid in rendering the clutch active or inactive, for it eliminates the necessity for the present heavy clutch spring and corresponding heavy pedal pressure.

As a further important feature, the parts of the fluid clutch are so designed as to provide a compact arrangement and an improved casing structure.

Other objects and advantages will be pointed out hereinafter or will be apparent from a consideration of the embodiments illustrated in the accompanying drawings. It is to be understood that these drawings are to be considered in an illustrative rather than in a limiting sense.

In the constructions illustrated I have combined my improved construction with an engine flywheel 10 which may be attached by the usual annular row of bolts 11 to the flange 12 of a driven member or shaft 13. The periphery of the flywheel may have the usual gear teeth 14 intended primarily for engagement with the gear of an engine starter, but obviously adapted for use in driving any parts which are not to be driven through the clutch and hydraulic power transmitter. The flywheel is provided with a peripheral substantially cylindrical flange 15 which cooperates with the main body of the flywheel to form a chamber within which is mounted the hydraulic power transmitter and clutch.

The form shown in Figs. 1 to 5, inclusive, includes a driving member or impeller 16 and a driven member or turbine rotor 17, each having an annular set of fluid passages. The passages of the driving member have substantially radial components so that centrifugal force causes liquid to be delivered therefrom for action on the vanes, blades or passage walls of the other member. The annular row of inlets to the passages of the driven member is juxtaposed to the annular row of outlets for the passages in the driving member, and the outlets for the passages in the driven member deliver the liquid so that it may enter the inlets for the passages in the driving member. Thus liquid may circulate through the two members as they rotate and the driven member will be caused to rotate by the impact of the liquid delivered from the driving member. In the form shown the outlets for the passages of the driven member and the inlets for the passages of the driving member face each other approximately axially in a plane at right angles to the axis of rotation and the outlet portion of the impeller is carried over the outer or inlet ends of the passages in the driven member and faces the same at a circular cylindrical surface having for its axis the axis of rotation of the driving and driven members.

The casing of the hydraulic transmission and clutch includes outer casing members 18 and 19 provided respectively with peripheral flanges which are secured to the flange 15 at its edge. The casing member 18 as shown has no openings inside of its peripheral flange and at its center is cupped to fit into a recess which may be provided in the flanged end of the driving shaft 13, and to receive an anti-friction bearing 20.

The driven member 17 may include a disc 21 having a peripheral flange 22 the outer surface of which is so curved as to guide the liquid from the driven member smoothly into the inlet of the driving member, and at its center a sleeve keyed on the driven shaft 23. The disc has a centrally disposed axially projecting stud fitting into the ball bearing 20 so as to maintain the parts in axial alignment and support the disc and the parts attached thereto. Secured to the disc 21 at its left face (Fig. 1) is an annular member including spaced walls 24 and 26 between which the vanes 25 of the driven member 17 are secured. The wall 24 is directly attached to the disc 21 but the wall 26 is spaced therefrom or apertured so that the liquid flowing inwardly between the walls may be deflected axially along the curved surface of the flange 22.

Extending inwardly from the flange 22 of the driven member is an annular member 27 which includes a sleeve 28 forming a liquid tight joint with the end wall 19 of the driving member. Projecting through this sleeve is an axially movable sleeve 29 fitting over and keyed to the driven shaft 23. The inner end of the sleeve 29 may be enlarged to encircle the inner end of the sleeve at the center of disc 21.

Figures 1, 2:
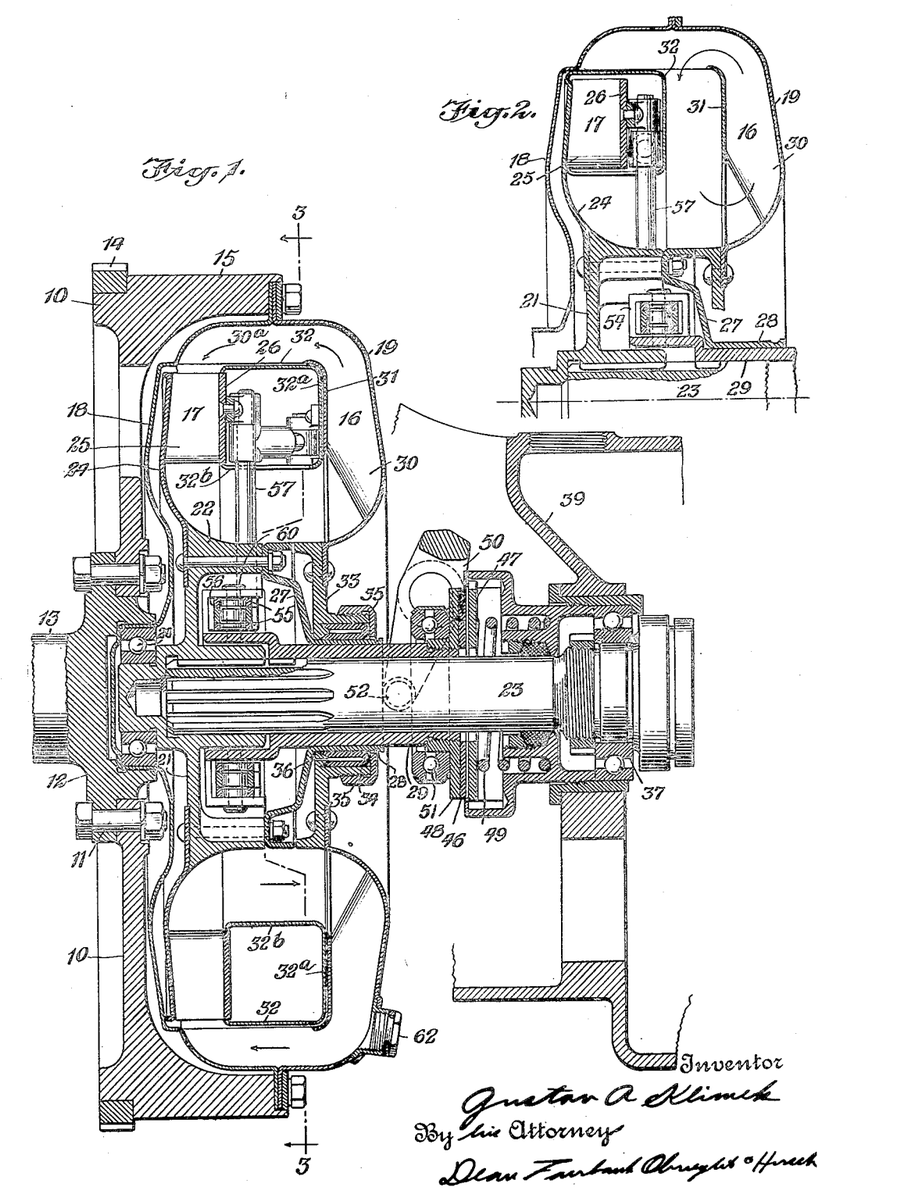
Fig. 1 is a central longitudinal section of a device constructed in accordance with my invention showing the parts in driving position, said section being taken on the line 1—1 of Fig. 3.
Fig. 2 is a similar section showing certain of the parts in idling position.
Figure 3:
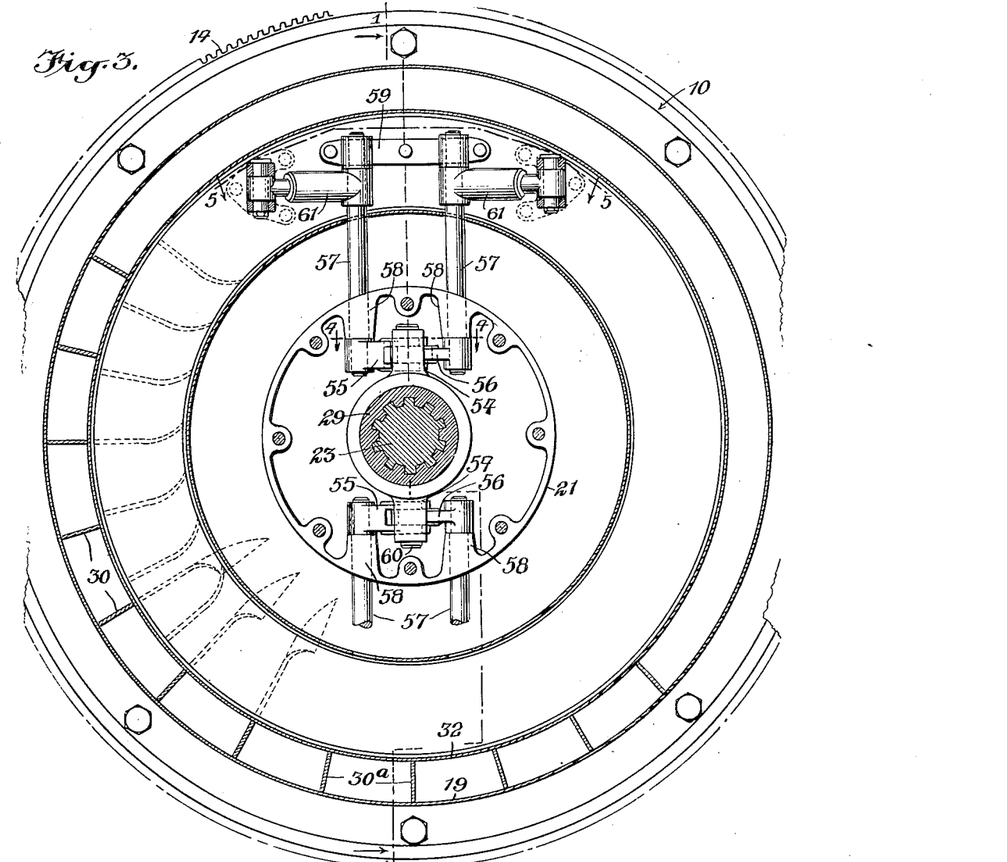
Fig. 3 is a transverse section on the line 3—3 of Fig. 1.
Figures 4, 5:
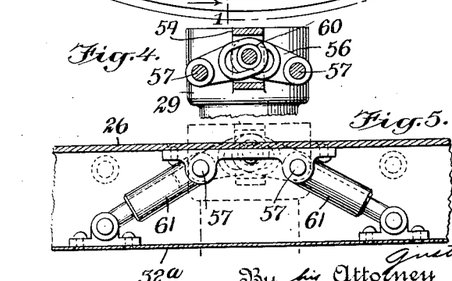
Figs. 4 and 5 are sections on the lines 4—4 and 5—5 respectively of Fig. 3.

The impeller 16 has vanes or blades 30 each attached at one edge to the casing member 19 and at the other edge to an annular wall 31 which is spaced from and substantially parallel to the wall 26 of the driven member. With the parts in position as shown in Fig. 1, a cylindrical wall 32 is spaced from the peripheral wall of the liquid chamber and extends from the outer edge of the wall 31 to the outer edge of the wall 26. The annular space thus defined preferably has blades or vanes 30a forming extensions of the blades 30. Thus the liquid is guided from the driving member to the driven member of the fluid clutch. The cylindrical wall 32 may be integral with or connected to a radial wall 32a which may lie against the wall 31, and a second smaller cylindrical wall 32b extending from the inner edge of the wall 31 to the inner edge of the wall 26. The walls 32, 32a and 32b form a gate which is open at the side toward the driven member 17 so as to permit axial movement to the position shown in Fig. 2. In this position the walls 32 and 32b cover the inlet and outlet ends of the passages in the driven member 17. The wall 32a being parallel to the wall 31 provides a by-pass from the outlet to the inlet ends of the driving passages when said walls are separated by relative axial movement.

It will be noted that as the gate is moved from the Fig. 1 position to the Fig. 2 position, the fluid flow through the passages of the driven member will gradually be decreased and the flow through the by-pass gradually increased until the gate 32 reaches its Fig. 2 position and all of the fluid from the driving member 16 is by-passed freely and without obstruction and of course without driving effect on the driven member.

At its inner edge the casing member 19 is attached to or integral with a disc or member 33 provided with a hub rotatable on the sleeve 28. This hub has a gland or annular stuffing box to receive a packing ring or gasket 34 which is held in place by an adjustable gland nut or collar 35. It will be seen that the packing ring or gasket is in the form of a folded strip with the free edges toward the inside of the casing so that liquid passing from the casing through one or more openings 36 will force the edges apart and tend to produce a liquid tight seal.

At the rear of the controlling sleeve 29, the driven shaft 23 is supported in any suitable manner, as for instance, by a ball bearing 37 carried by the transmission casing 39.

For reciprocating the controlling sleeve 29, the latter may be provided with a cylindrical flange 48. On one side of this flange is a coil spring 49 acting to move the sleeve toward the left and hold the parts in driving position. Between the end of the spring and the flange 48 there may be a non-rotatable plate 47 and a friction disc 46. This serves as a brake to help stop the driven member from rotating when the sleeve is moved out to close the gate and open the by-pass. On the opposite side of the flange is the fork 50 of an operating lever. Between rollers 52 on the end of the fork and the flange may be a thrust ball bearing 51.

For operating the gate upon the reciprocation of the controlling sleeve 29 the inner end of the latter is provided with brackets 54 open at their sides to receive arms 55 and 56 mounted on the inner ends of and adapted to turn shafts 57 journalled at their inner ends in bearings 58 in the flange 22 and at their outer ends in brackets 59 on the wall 26. The shafts 57 pass through slots in the inner cylindrical wall 32b of the gate which slots are of sufficient length to permit the desired shifting of the gate. The arms 55 may be forked to receive the ends of the arms 56 and both arms may have longitudinal slots to receive pivots 60 mounted in the brackets 54 and to permit the shafts 57 to be rocked by longitudinal movement of the sleeve 29.

Mounted on the outer ends of the shafts 57 near the brackets 59 are extensible arms 61. These may consist of hollow sleeves mounted on the shafts 57 and rods slidable in said sleeves. The other ends of these arms are pivoted to the annular side wall 32a of the gate.

When it is desired to throw out the clutch the fork 50 may be swung about its pivot to shift the sleeve 29 rearwardly against the resistance of the spring 49 and to shift the gate 32 to its Fig. 2 position. This causes the liquid to be by-passed freely and without obstruction. It will be seen that as the sleeve 29 is shifted rearwardly the flange 48 will be pressed against the spring-supported plate 47 and the driven shaft 23 may be brought to rest by the resulting braking action.

It will be noted that the casing, particularly due to the fact that the forward casing member is continuous or imperforate within the periphery thereof, is very effective in preventing the escape of the operating liquid. The fluid may be withdrawn or additional fluid admitted through an opening in the casing member 19, such opening being normally closed by a screw plug 62.

Figures 6, 7:
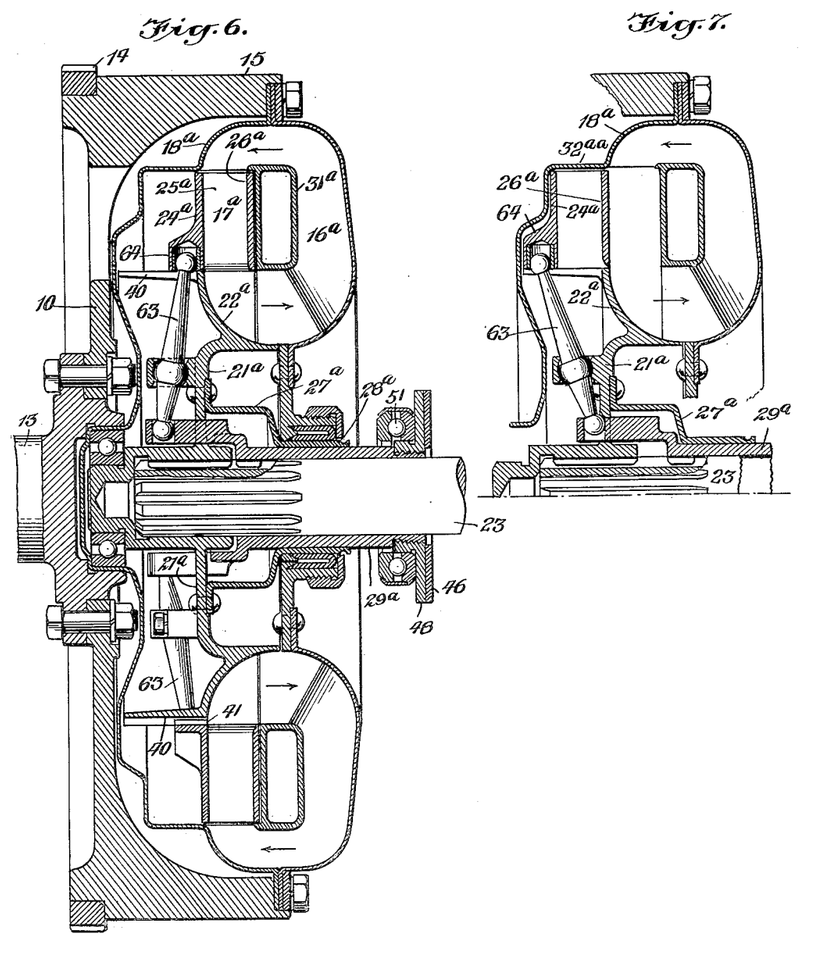
Fig. 6 is a central longitudinal section of a second embodiment of my invention with the parts in driving position.
Fig. 7 is a section similar to a portion of Fig. 6 but with the parts in idling position.

In the embodiment illustrated in Figs. 6 and 7, instead of shifting a gate over the driven member, I shift the driven member into a gate or closure member. As shown the turbine rotor 17a includes a disc 21a having at its center a sleeve keyed to the driven shaft 23 and at its outer part a curved annular flange 22a inclined gradually from its upper edge rearwardly to its lower rear edge so as to guide the liquid substantially rearwardly to the inlets of passages between the blades of the impeller 16a. At its rear the disc 21a is connected with a member 27a terminating in a sleeve 28a encircling the controlling sleeve 29a.

The vanes 25a of the driven member 17a are connected at their front and rear edges respectively with walls 24a and 26a and form therewith an element slidable on member 22a from its Fig. 6 position where it receives an energized liquid to its Fig. 7 position where the wall 26a cooperates with the casing member 18a and the curved flange 22a to provide a free and unobstructed by-pass passage from the outlets of the passages in the driving member 16a to the inlets of the same. In order to enable this shifting action of the driven member and its vanes 25a and walls 24a and 26a to close the inlets to said passages, the casing member 18a curves forwardly and downwardly from the flange 15 of the flywheel to form a substantial continuation of the rear face of the member 24a in its Fig. 6 position and has a cylindrical portion 32aa long enough to house the shiftable portion of the turbine rotor as indicated in Fig. 7. In this position the wall 26a forms one side wall of the by-pass. The other side of the by-pass is formed by the wall 31a which in this form is of substantial thickness and preferably hollow.

The flange 22a has a cylindrical flange 40 at its outer edge which closes the inner ends of the passages of the driven member when the latter is shifted to inactive position.

The shifting of the vanes 25a from their Fig. 6 to their Fig. 7 positions or vice versa may be effected by levers 63 fulcrumed by ball and socket connections on the disc 21a. These each have a round outer end extending into a socket 64 on the wall 24a and a round inner end extending into a recess in extensions on the inner end of the sleeve 29a through suitable openings in said disc 21a. Upon movement of the sleeve 29a outwardly the shiftable parts will assume their Fig. 7 positions and the clutch will be disconnected since the liquid from the impeller will pass freely and without obstruction through the by-pass. In the return movement of the sleeve 29a the energized liquid will be fed to the vanes of the rotor in gradually increased amounts until the full flow from the impeller acts thereon.

The flange 40 and the inner surface or end of the shiftable member have interengaging teeth or keyways 41 so as to prevent any relative rotation of the parts and to relieve the levers 63 of any rotational strain. The levers extend through slots in the flange 40.

Figure 8:
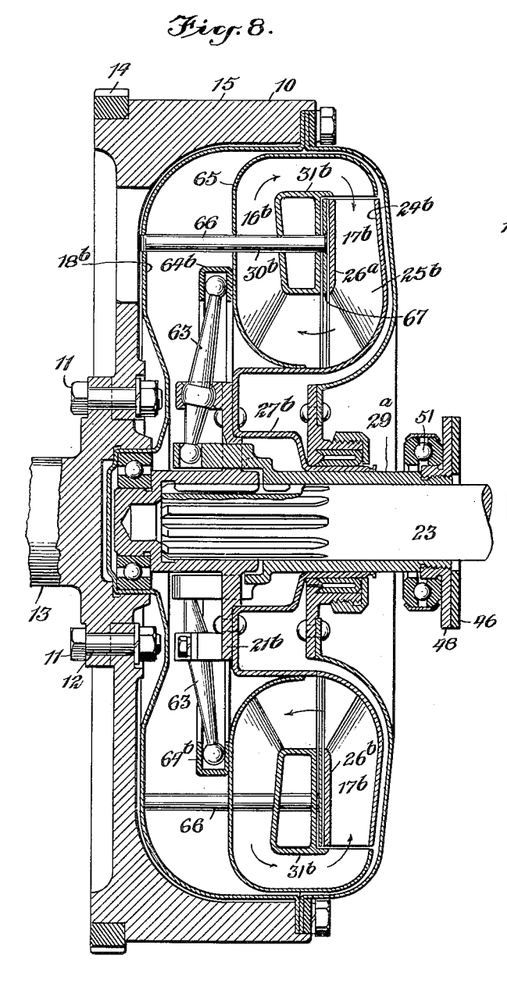
Fig. 8 is a central longitudinal section of a third embodiment of the invention with the parts in driving position.
Figure 9:
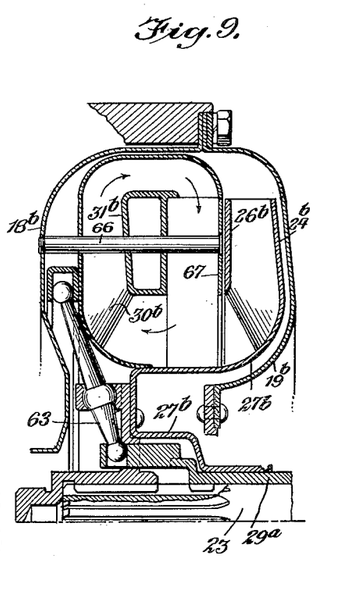
Fig. 9 is a section similar to a portion of Fig. 8 but with the parts in idling position.

In the embodiment illustrated in Figs. 8 and 9, the structure is in general similar to that shown in Figs. 6 and 7 except that the driving and driven members 16b and 17b are reversed in position and it is the driving member instead of the driven member which is shifted into and out of effective position. The member 21b extends outwardly from the shaft a sufficient distance to provide ball and socket supports for levers 63 having their inner ends engaged in openings in extensions on the controlling sleeve 29a. Their rounded outer ends extend into the inwardly facing channel of an annular member 64b attached to a part of the driving member 16b for instance to the curved wall 65, thereby enabling rotation of the driving member or impeller with reference to the levers 63.

The blades 30b of the driving member connect the member 65 and a hollow annular member 31b. For slidably supporting the driving member 16b, there are provided rods or other members 66, parallel to the axis of the device and supported at their ends by the casing wall 18b and an annular wall 67 lying parallel to and closely adjacent to the wall 26b of the driven member.

The member 27b, while similar in other respects to member 27a of Figs. 6 and 7, is extended axially and outwardly to provide the outer and rear wall 24b of the driven member 17b. The blades 25b of the driven member connect the wall 24b and the wall 26b positioned close to the annular member 67 and of substantially the same width in a radial direction. It will be seen that when the shiftable parts are in their Fig. 8 position, the energized liquid from the driving member or impeller 16b is supplied to the driven member or turbine rotor 17b inwardly and in a radial plane to the blades or vanes 25b of the turbine rotor 17b thereby avoiding any end thrust which would interfere with the shifting action. The inner edge of the wall 65 slides on the inner cylindrical portion of the wall 24b.

It will be seen that my combined fluid transmitter and clutch may not only protect the mechanism from the jars and sudden strains of irregular engine operation, but also, due particularly to the feature of providing means for preventing the flow of the energized fluid through the turbine rotor and opening a by-pass through which the energized fluid may flow substantially, freely and without obstruction back to the inlet of the impeller, enable the engine to idle without any tendency to actuate the turbine rotor. It will be noted that many parts such as the casing sections are made from relatively thin or sheet metal but are so shaped and connected with other parts as to provide the desired strength and stiffness.

As will be evident from the scope of the appended claims, various other changes in the details of construction may be made without departing from the spirit of my invention.

Having thus described my invention, what I claim as new and desire to secure by Letters Patent is:

1. A power transmitter including a pump impeller, a turbine rotor for receiving liquid directly from said impeller and returning said liquid directly to the impeller, and means for by-passing the liquid freely and without obstruction past the rotor to the inlet of the impeller and simultaneously closing the inlet of the rotor.

2. A power transmitter including a pump impeller, a turbine rotor for receiving liquid directly from said impeller and returning it to said impeller, means for closing the inlet of the turbine rotor and means for effecting a free and unobstructed return to the impeller of fluid energized by the impeller, thereby relieving said rotor of the driving effect of the rotating pump impeller.

3. A power transmitter including a pump impeller member, a turbine rotor member for receiving liquid directly from said impeller and returning said liquid to the impeller, means operable in accordance with the relative position of said pump impeller and said turbine rotor member for supplying actuating fluid directly from the impeller member to the rotor member and returning it therefrom to the impeller member, and means operable in accordance with the relative position of said pump impeller and said turbine rotor member for by-passing the liquid from the outlet of the impeller to its inlet whereby driving relationship between said pump impeller and said turbine rotor member is suspended.

4. A power transmitter including a pump impeller, a turbine rotor for receiving liquid directly from said impeller and returning said liquid directly to the impeller, and means for by-passing the liquid freely and without obstruction past the rotor to the inlet of the impeller, and also adapted to shut off the fluid energized by the impeller from the by-pass and to direct it to the rotor or vice versa.

5. A power transmitter including a pump impeller, a turbine rotor for receiving liquid directly from said impeller and returning it directly to said impeller, by-pass means for permitting a free and unobstructed return to the impeller of fluid energized by the impeller thereby relieving the turbine rotor from the driving effect of the rotating pump impeller, and a gate shiftable to close either said rotor or said by-pass means.

6. A power transmitter including a rotary pump having an impeller and adapted to impart energy to a fluid, a turbine having a rotor to receive fluid directly from said impeller and return it thereto, both the pump and the turbine being arranged to provide a by-pass between the impeller and the rotor and having passages with curved outer walls to guide the fluid throughout a complete circuit through said pump impeller and said rotor, and a device adapted to close said by-pass and complete the circuit through said impeller and said rotor or to prevent the passage of the fluid through said rotor and provide a clear and unobstructed flow of the fluid from the impeller through the by-pass and back to the impeller.

7. A power transmitter including an impeller adapted to impart energy to a fluid, a turbine rotor capable of receiving power from the energized fluid, a casing enclosing said impeller and said rotor and providing a passage having a curved outer wall to direct the energized fluid from said impeller to said rotor, said impeller, a rotor and casing being arranged with respect to each other to provide a by-pass between the impeller and rotor, and means to close the by-pass and cause the fluid to make a complete circuit through the impeller and rotor or to prevent the flow of the fluid to the rotor and provide a complete free and unobstructed circuit through the by-pass and the impeller.

8. A combination fluid clutch and resilient coupling including a continuously rotating impeller, a turbine rotor to receive fluid directly from the impeller and return the fluid directly to said impeller, and means for effecting a free and unobstructed return to the impeller of the fluid energized thereby and relieving the rotor of the driving effect of the energized fluid.

9. A power transmitter for connecting coaxial driving and driven members, including a flywheel adapted to be secured to said driving member, an inward flow turbine rotor mounted on and adapted to rotate said driven member, a centrifugal pump impeller secured to said flywheel and adapted to supply energized fluid directly to said rotor and receive said fluid directly from said rotor, a by-pass between the impeller and the rotor, and means for directing the energized fluid either to the rotor or to the by-pass including an annular member shiftable to close the inlet of said rotor or the inlet of said by-pass.

10. A power transmitter for connecting coaxial driving and driven members, including a flywheel adapted to be secured to said driving member, an inward flow turbine rotor mounted on and adapted to rotate said driven member, a centrifugal pump impeller secured to said flywheel and adapted to supply energized fluid to said rotor, a by-pass between the impeller and the rotor, means for directing the energized fluid either to the rotor or to the by-pass including an annular member shiftable to close the inlet of said rotor or the inlet of said by-pass and means including a sleeve on said driven member for shifting said annular member.

11. A power transmitter including a driving element comprising a shaft and a flywheel on the end thereof, a driven shaft in alignment with the axis of the driving member and with its end close to the end of the driving shaft, a pump impeller connected with said driving shaft to turn therewith, a turbine rotor connected with said driven shaft and adapted for receiving fluid directly from said impeller and returning it thereto, and a casing for said impeller and said rotor including a unitary sheet-metal end secured to said flywheel at its periphery and forming a complete barrier between said driving and driven member.

12. A power transmitter including a driving element comprising a shaft and a flywheel on the end thereof and provided with a central recess, a driven shaft in alignment with the driving element and adapted to project into said recess, a pump impeller connected with said driving shaft to turn therewith, a turbine rotor connected with said driven shaft and adapted for receiving fluid directly from said impeller and returning it thereto, and a casing for said impeller and said rotor including a unitary sheet-metal end secured to said flywheel at its periphery and forming a complete barrier between said driving and driven shafts, said sheet-metal end being shaped at its center to project into said central recess of said driving member.

13. A power transmitter including a driving element comprising a shaft and a flywheel on the end thereof and having a central recess, a driven shaft in alignment with the driving element and adapted to project into said recess, a pump impeller connected with said driving shaft to turn therewith, a turbine rotor connected with said driven shaft and adapted for receiving fluid directly from said impeller and returning it thereto, a casing for said impeller and said rotor secured to said flywheel for rotation therewith and including a unitary sheet-metal end secured to said flywheel at its periphery and shaped at said center to form a cup fitting in said recess and an anti-friction bearing seated in said cup and supporting the end of the driven shaft.

14. A flywheel on the end of a driving shaft, a sheet-metal member secured to said flywheel at its periphery and continuous with in said periphery to provide a complete fluid seal across the face of the flywheel, a driven shaft in alignment with said driving shaft, an annular wall rotatable about said driven shaft and secured to the periphery of the flywheel, its intermediate portion spaced from said sheet-metal member to form a chamber, a centrifugal pump impeller in said casing and secured to said flywheel, and a turbine rotor in said casing adapted to rotate said driven shaft.

15. A fluid power transmitter including a continuously rotating centrifugal impeller, a turbine rotor to receive fluid directly from the impeller, a controlling member slidable axially of the rotor, means under the control of said controlling member for effecting a free and unobstructed return to the impeller of the fluid energized thereby, and spring-pressed means for urging said controlling member to render said transmitter effective and for bringing the turbine rotor to rest when said controlling member is shifted against the spring action.

16. A fluid power transmitter including a continuously rotatable impeller, a turbine rotor having blades and adapted to receive fluid directly from the impeller and return it thereto, an annular member slidable axially of the transmitter to cause the energized fluid to pass through the blades of the rotor or to be by-passed from the outlet to the inlet of the impeller substantially, freely and without obstruction, a driven shaft rotatable by said rotor, a controlling sleeve keyed to and slidable on said shaft, rotatable shafts extending outwardly from said driven shaft to said annular member, connections between said rotatable shafts and said annular member for shifting the same, and connections between the controlling sleeve and said rotatable shafts for rotating the latter by shifting the sleeve.

17. A fluid power transmitter including a continuously rotatable impeller, a turbine rotor having blades and adapted to receive fluid directly from the impeller and return it thereto, an annular member slidable axially of the transmitter to cause the energized fluid to pass through the blades of the rotor or to be by-passed from the outlet to the inlet of the impeller substantially, freely and without obstruction, a driven shaft rotatable by said rotor, a controlling sleeve keyed to and slidable on said shaft, rotatable shafts arranged in pairs and extending outwardly from said driven shaft to said annular member, connections between said rotatable shafts and said annular member including for each pair of shafts arms extending from the shafts at their outer ends and diverging toward said annular member, and connections between the controlling sleeve and said rotatable shafts for rotating the latter by shifting the sleeve.

18. A fluid power transmitter including a continuously rotatable impeller, a turbine rotor having blades and adapted to receive fluid directly from the impeller and return it thereto, an annular member slidable axially of the transmitter to cause the energized fluid to pass through the blades of the rotor or to be by-passed from the outlet to the inlet of the impeller substantially, freely and without obstruction, a driven shaft rotatable by said rotor, a controlling sleeve keyed to and slidable on said shaft, rotatable shafts extending outwardly from said driven shaft to said annular member, connections between said rotatable shafts and said annular member for shifting the same, and connections between the controlling sleeve and said rotatable shafts for rotating the latter by shifting the sleeve, including arms on the inner ends of the shafts of each pair converging forwardly and having overlapping slotted ends, and a pivot on said controlling sleeve and passing through said slotted ends.

19. A fluid power transmitter including a driving shaft, a driven shaft in alignment therewith, a casing turning with said driving shaft and adapted to receive the end of said driven shaft, impeller blades secured to said casing and extending along the back thereof and forward along the top thereof, an annular member at right angles to the axis of the transmitter and attached to the forward edges of the blades at the rear of the impeller, a rotor member in the casing and connected with the driven shaft for rotating the same and providing a curved annular surface to direct the energized fluid from the forward overhanging outlet part of the impeller to the inlet of the impeller, rotor blades attached to said rotor member at its rear face, an annular member attached to said rotor blades at their rear edges and spaced from the corresponding annular member of said impeller to provide a by-pass therebetween, and a gate slidable on said rotor to close the by-pass and open the passages between the rotor blades or to open the by-pass and close the passages.

20. A power transmitter including a pump impeller member, a turbine rotor member for receiving liquid directly from said impeller and returning said liquid to the impeller, said impeller member and rotor member being positioned in co-axial relationship, control means for axially shifting the relative position of said rotor member and said impeller member, means responsive to the actuation of said control means in one direction for projecting the liquid from the impeller member to the rotor member, whereby a driving relationship is effected between said members, and means responsive to the actuation of said control means in the opposite direction for by-passing the actuating liquid past the rotor to the inlet of the impeller whereby driving relationship between said members is suspended.

Signed at Pontiac in the county of Oakland and State of Michigan this 28th day of February A. D. 1927.

GUSTAV A. KLIMEK.